United States Patent [19]

Campbell et al.

[11] Patent Number: 4,985,928
[45] Date of Patent: Jan. 15, 1991

[54] SIGNATURE FORGERY DETECTION DEVICE

[76] Inventors: Robert K. Campbell, 12502 Strathmore Rd., Garden Grove, Calif. 92640; John F. Cerlanek, Jr., 1423 Lambda Pl., Anaheim, Calif. 92805; Kurt E. Schwalbe, P.O. Box 5847, Huntington Beach, Calif. 92615

[21] Appl. No.: 349,861

[22] Filed: May 10, 1989

[51] Int. Cl.$^5$ .............................................. G06K 9/00
[52] U.S. Cl. ........................................... 382/3; 382/16
[58] Field of Search ................... 382/3, 13, 7, 16, 18, 382/4, 21, 30

[56] References Cited

U.S. PATENT DOCUMENTS

| | | | |
|---|---|---|---|
| 3,480,911 | 11/1969 | Danna | 340/146.3 |
| 3,563,097 | 2/1971 | Roggenstein et al. | 73/432 |
| 3,618,019 | 11/1971 | Nemirovsky et al. | 340/146.3 |
| 3,621,720 | 11/1971 | Clark | 73/432 |
| 3,699,517 | 10/1972 | Dyche | 340/146.3 |
| 3,818,443 | 6/1974 | Radcliffe, Jr. | 340/146.3 |
| 3,959,769 | 5/1976 | Sternberg et al. | 340/146.3 |
| 4,008,457 | 2/1977 | Radcliffe, Jr. | 340/146.3 |
| 4,028,674 | 6/1977 | Chuang | 340/146.3 |
| 4,035,769 | 7/1977 | Sternberg et al. | 340/146.3 |
| 4,086,567 | 4/1978 | Crane et al. | 340/146.3 |
| 4,128,829 | 12/1978 | Herbst et al. | 340/146.3 |
| 4,143,357 | 3/1979 | Baver et al. | 340/146.3 |
| 4,286,255 | 8/1981 | Siy | 340/146.3 |
| 4,308,522 | 12/1981 | Paganini et al. | 340/146.3 |
| 4,344,135 | 8/1982 | Crane et al. | 364/419 |
| 4,433,436 | 2/1984 | Carnes | 382/3 |
| 4,475,235 | 10/1984 | Graham | 382/3 |
| 4,495,644 | 1/1985 | Parks et al. | 382/3 |
| 4,553,258 | 11/1985 | Chainer et al. | 382/3 |
| 4,553,259 | 11/1985 | Chainer et al. | 382/3 |
| 4,562,592 | 12/1985 | Chainer et al. | 382/3 |
| 4,581,482 | 4/1986 | Rothfjell | 128/18 |
| 4,646,351 | 2/1987 | Asbo et al. | 382/3 |
| 4,653,107 | 3/1987 | Shojima et al. | 382/13 |
| 4,680,801 | 7/1987 | Etherington et al. | 382/3 |
| 4,736,445 | 4/1988 | Gundersen | 382/3 |
| 4,752,965 | 1/1988 | Dunicley et al. | 382/13 |
| 4,827,527 | 5/1989 | Morita et al. | 382/4 |

Primary Examiner—David K. Moore
Assistant Examiner—Yon Jung
Attorney, Agent, or Firm—Thomas P. Mahoney; J. Mark Holland

[57] ABSTRACT

A method and apparatus for handwriting analysis wherein a signature or other writing can be subjected to comparison with a reference signature. The apparatus and method rely on the collection of measurements of the optical density of a plurality of elements in the specimen and selectively retaining said measurements and then comparing each density measurement to a threshold value. Ultimately, only those density measurements are retained which are located within a bounded locus. After the retained density measurements have been established, they are automatically compared to the measurements of the specimen signature to permit the apparatus to accept or reject the signature on the presented document.

4 Claims, 3 Drawing Sheets

SIGNATURE FORGERY DETECTION DEVICE

BACKGROUND OF THE INVENTION

This invention relates to handwriting analysis. More particularly, the invention relates to a device and method for analyzing a handwritten specimen such as a signature or the like.

Fraudulent handwritten documents and signatures cause large financial losses. Untrained observers are not able to reliably distinguish authentic specimens from forgeries even with the availability of an authentic reference specimen.

This is particularly the case with large financial institutions which rely on signature identification for such media of exchange as checks, traveler's checks and the like.

At the present time, bank tellers and other employees are confined to visual comparison of the relevant signature with a previously executed signature on a bank card or the like. Since tellers and other bank employees are not document experts, it can be expected that numerous mistakes will be made in signature comparisons. Where reliance is had upon confirmatory signatures, such as those appearing on driver's licenses, credit cards and the like, such corroboratory documents can be as readily forged as the signature on the check or other article which is subject to confirmation.

Variations in the applied pressures, or in some combination of the applied pressures, direction and timing of the movement of a stylus during an act of handwriting are unique to an individual. The measurement of these variations has been the basis of several systems for handwriting analysis or signature verification. U.S. Pat. Nos. 4,008,457, 3,956,734, 3,563,097, 3,906,444, 3,480,911, 4,040,010, 4,040,011, 4,040,012, 4,308,522, 4,131,880 and 4,111,052 all teach special apparatus whereby the variations may be converted into electrical signals for analysis. Each requires the writer to use the device to produce the handwriting specimen. None is capable of examining a document.

Many prior art devices utilize pressure-sensitive pads or styluses which entail the execution of the signature at the bank or other location where a check or other document is presented for negotiation. Unfortunately, the present-day pressures on bank facilities render the utilization of such devices impractical. Moreover, most check signatures are inscribed prior to presenting at the teller window and, consequently, they are not subject to verification by the prior art devices which utilize the pressure stylus or plate methods of verification.

The variations in applied pressure and direction of the stylus during handwriting produce corresponding variations in the density of application of ink to the document. The document thus incorporates the idiosyncratic features inherent in the act of handwriting.

The technology of optical character recognition wherein a document is optically scanned is exemplified in the barcode reader of U.S. Letters Pat. No. 4,369,361 and similar devices operating on human readable characteristics, producing a binary representation of a scanned document. This has been useful in deciphering handwritten text, but the binary nature of the data precludes analysis of many idiosyncratic features.

The technology of digital image processing wherein a document is optically scanned with transformation of the optical density information to digital form preserves density variations, but produces a monumental amount of data which requires considerable processing power.

OBJECTS AND ADVANTAGES OF THE INVENTION

It is, therefore, an object of this invention to provide a device and a method for analyzing a specimen of handwriting on a document.

It is a primary object of the invention to eliminate the necessity for use of prior art devices of a pressure-sensitive responsive design, such as pressure-sensitive tablets or styluses, and to provide a device and method which is capable of immediately establishing the authenticity of a previously inscribed signature on a document by comparison with a previously inscribed master signature.

A further object of the invention is the provision of a device of the aforementioned character which can be incorporated in a plurality of terminals located at the teller windows, or other locations, said terminals being connected to the circuitry which, by comparison of various relevant aspects of the previously written signature with the master signature, can establish the authenticity of the previously written and presented signature.

It is a further object of the invention to provide a method and device for analyzing a specimen free of the burden of large processing power requirements.

The device of the invention implements the method of the invention by collecting measurements of the optical density of samples of handwriting. These data are reduced by selectively retaining only those which exceed the value of a threshold. The data are further reduced by selectively retaining only those measurements which are locally continuous—those which correspond to portions of the sample which form continuous line segments of at least a predetermined length. The retained measurements and their locations are subsequently processed and compared to a reference specimen. The reference specimen may be another optically scanned sample, or it may be a set of reduced data from such a sample or from a sample recorded by some other method, as real time pressure variation recording.

Another object of the invention is the provision of a device and method of the aforementioned character whereby the presented, previously written or inscribed signature or other sample of handwriting will be converted to a set of vectors which contain the average density reading across the width of the signature line and the X and Y coordinates of the center of the line.

Another object of the invention is the provision of a device of the aforementioned character wherein the aforesaid vector points will be organized as a sequential set of points to permit the flagging of end and crossing points.

An additional object of our invention is the provision of a device of the aforementioned character wherein a five-point smoothing algorithm will be utilized to average out any miniscule imperfections ascertained in the signature which will accomplish the averaging of two points on both sides of the point being averaged to perceive both the density at the point being averaged so that both density and X and Y position may be read.

A corollary aspect of the device permits the normalizing of the signature to equate the size of the preinscribed, presented signature to be scaled to that of the comparison signature.

Among the other indicia of the presented signature to be read are the length of the signature and the height of the signature. Such reading is accomplished by simple multiplication of the X and Y coordinates for all points in the signature being read.

Moreover, density scaling will be accomplished in a similar manner by averaging the density of the entire signature and multiplying each point read by a factor to reduce the presented signature to the average density of the master signature.

Another object of the invention is the provision of a device of the aforementioned character which accomplishes the division of the presented signature into line segments which maintain the position of signature points for connection of segments. Line segments are defined by crossing points in the signature and the point at which the differential is zero, namely, the top point of a character and the bottom point of a character. The point at which the line segment is asymptotic or differential is infinity, namely, the right, most extreme point of the character and the left, most extreme point of the character being analyzed.

Another object of the invention is the provision of a device of the aforementioned character which will establish matching segments in the reference and master signatures that have similar shapes. It must be certain that the matching segments represent the real segment in the signature since improperly matched segments will result in a higher rejection rate of segments. Nevertheless, mechanically incorrect segments will detect forgeries by causing a high percentage of unmatched segments.

Characteristics between matching segments which will establish correspondence between the presented and master signatures are similar starting and ending points; similar lengths; similar crossing points; and connections to similar segments.

Similar angular variations for all points on the segment will be determined by ascertaining the angle form between two points. In addition, the angular difference between two points will also be utilized to establish conformity or lack of conformity of signatures. This analysis may be more accurately performed by normalizing the length of the segment under test and imparting the same starting and ending points to it.

A further object of the invention is the provision of a device of the aforementioned character which establishes the density variations of the presented signature. To accomplish this ascertainment, the absolute normalized density of corresponding points in the presented signature is established for comparison with the reference signature, as is the change in density from one point to the next for corresponding points in the presented signature, which is then compared to the reference or master signature.

Permissible variations between presented and master signatures is determined empirically to apprehend the greatest number of forged signatures while accomplishing the verification of the greatest number of valid signatures.

For instance, a presented signature may have approximately 40 to 100 segments and a predetermined percentage of said segments must match with the master signature within empirically determined limits to be considered valid.

BRIEF DESCRIPTION OF THE DRAWINGS

Other objects and advantages of the invention will be apparent from the following specification and the accompanying drawings, in which.

DETAILED DESCRIPTION OF THE INVENTION

The signature verification device 10 of the invention processes data derived from optical density and other measurements of handwriting specimens. The measurements are most preferably collected by the device itself, but they may be supplied from other sources. The preferred embodiment of the device of the invention divides the density measurement and preliminary data reduction functions from the higher processing functions in physically separate units in communication with one another. In this way, a single processing unit 12, FIG. 2, may serve the processing requirements of one or more scanning units 14, which may be remotely located, as at separate point of sale locations in a retail establishment or bank teller windows.

The optical density measurements may be collected by any of a number of methods known in the art, and other methods which may become available in the future. Exemplary of known, acceptable methods are a two-dimensional scan with a single detector, a one-dimensional scan with a linear array detector, and a fixed scan with a two-dimensional array detector.

Figure 1:
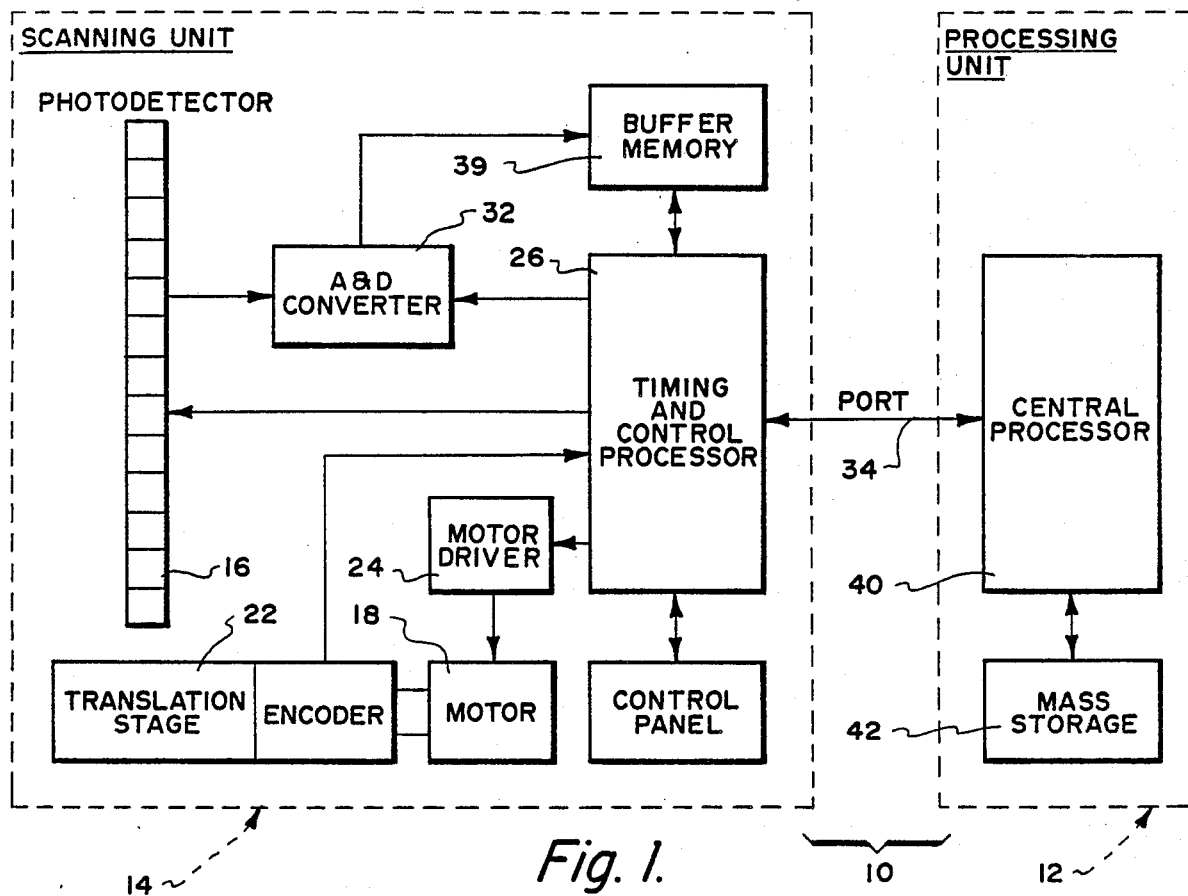
FIG. 1 is a block diagram depicting a preferred embodiment of the device of the invention.

In the preferred embodiment, optical density measurements are made by collecting light reflected by the specimen in a linear array photodetector 16, FIG. 1, which may be a line scan charge coupled device or photodiode array, as the photodetector and the specimen are translated with respect to each other along a line generally perpendicular to the axis of the photodetector array. The translation is accomplished by coupling a motor 18 to a translation stage 22 through any of a number of known methods, including a lead screw and nut, pulley and belt, and rack and pinion gear.

The motor 18 is driven by a motor driver 24, which is controlled by a timing and control processor 26. The timing and control processor 26 may receive position information from the translation stage 22 by a position encoder, or the system may operate in open loop fashion as with a stepping motor.

The spatial resolution of the optical density measurements utilized is as appropriate for the specimen and is usually in the range of 0.0001 or 0.1 inches, and preferably about 0.001 to 0.01 inches.

The density resolution of the measurements is again as appropriate for the specimen, usually in the range of 4 to 4000 gray levels and preferably about 20 to 1024 gray levels. We have discovered that 20 gray levels are sufficient to distinguish handwriting specimens, but the provision of a wider dynamic range of density measurement allows more latitude in the allowable variations of background color and reflectivity, and of ink type, color and reflectivity.

As the optical density measurements are collected, they are stored for subsequent processing. Storage and subsequent processing are most preferably conducted in digital form. To convert the measurements to digital form, any of a variety of data conversion methods may be used, but the practical application of the invention requires operation in a minimum time so that flash type analog to digital converters 32 are most appropriate. It is possible to transform the signal levels prior to conversion. For example, a logarithmic transformation enhances the dynamic range of the measurements at the expense of linearity.

Once converted to digital form, the measurements may be immediately processed, or stored in a buffer memory 39, or transmitted via port 34, to a central processor 40 for subsequent processing. When stored, both the measurement values and their corresponding positions in the specimen must be recorded The positions may be indirectly encoded by the storage address within a memory array, or locations in a transmitted data stream, or it may be explicitly coded as part of the digital data. If some data reduction precedes storage, explicit position coding is indicated. In any case, data may be stored locally in buffer memory 39, or may be transmitted for processing via the communication port 34 to the processing unit 12.

Once the measurements are made and converted to digital form, their number must be reduced. The process of data reduction includes the steps of threshold comparison and continuity testing.

In threshold comparison, measurements are compared in magnitude to a threshold value. This threshold value may be fixed, or it may be determined from the optical density and positioned measurements of various components of the signature. A threshold value may be determined from the optical density measurements by calculating a multiple of the peak or of the average optical density measurement.

The optical density measurements can be normalized to a normalizing value calculated as a multiple of the peak or of the average optical density measurement. This normalization may follow a thresholding step wherein the measurements are first compared to a fixed threshold value, with only those of magnitude greater than the threshold being retained. After normalizing to a multiple of the mean of the peak retained measurement level, the measurements may be compared to a second threshold value calculated as a fraction of the full normalization range, with only those normalized measurements of magnitude greater than the second threshold value being retained. This dual threshold technique has the benefit of adjusting for both gain and offset variations in the measurements.

The step of continuity testing selects retained measurements corresponding to portions of the specimen which form locally continuous curves. Such curves are produced as a natural consequence of the technique of handwriting.

Although reference has been made particularly to the establishment of density measurements, other aspects of the signature or other writing can be determined in accordance with the parameter set forth in the preamble to this application.

Handwriting is produced by serial movement of a stylus on a surface. The stylus may be repeatedly removed from the surface, but so long as the spatial resolution of the scanning process is finer than the smallest surface contacting movement of the stylus, all portions of the stylus travel path, as distinguished from other areas of the scanned specimen, will be adjacent to other portions of the stylus travel path.

Figure 5:
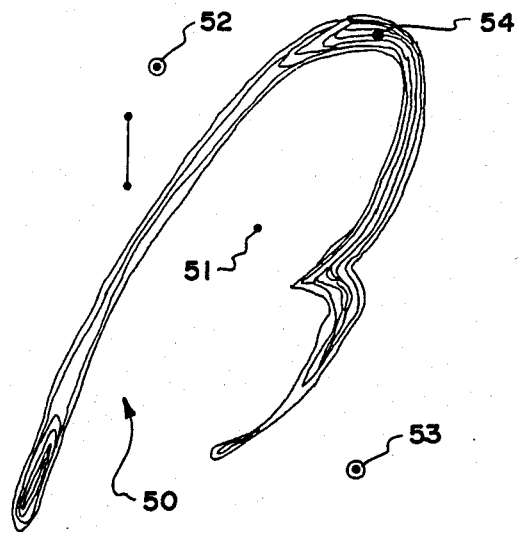
FIG. 5 is a visual exemplification of the optical density of a specimen of handwriting being analyzed.

The retention of only those measurements which correspond to portions of the stylus travel path, as determined by the juxtaposition of portions with measurements in excess of a threshold density value with other portions with measurements which also exceed the threshold density value, drastically reduces the quantity of data which must be further processed. Only those measurements corresponding to points within the outer contour interval, 50 of FIG. 5, would be retained. Noise, 51, 52 and 53, is rejected.

Isolated portions of the specimen which have measurements in excess of the threshold but which are not adjacent other such portions are rejected. Depending on the spatial resolution of the scanning process with respect to the minimum surface contacting travel of the stylus, a single neighboring portion of the specimen with a measurement exceeding the threshold may not be sufficient to ensure that the portion is part of the stylus travel path. Accordingly, the invention tests each portion of the specimen which exceeds the threshold value for the existence of a continuous chain of portions of the specimen, each with measurements which exceed the threshold value, beginning at the portion to be tested, and extending at least a predetermined distance.

The predetermined distance may be fixed, or it may itself be derived from the optical density measurements, as, for example, by locating a long continuous chain of portions in the specimen and calculating its average extent in a direction generally perpendicular to the direction of the chain. This corresponds to the width of a trace left by the stylus. A multiple of this width may then be used as the predetermined distance Once measurements corresponding to portions of the specimen which are not connected segments are rejected, the data may be further analyzed by determining the direction or directions of each of the segments and the intensity at each point along the length.

Figure 6:
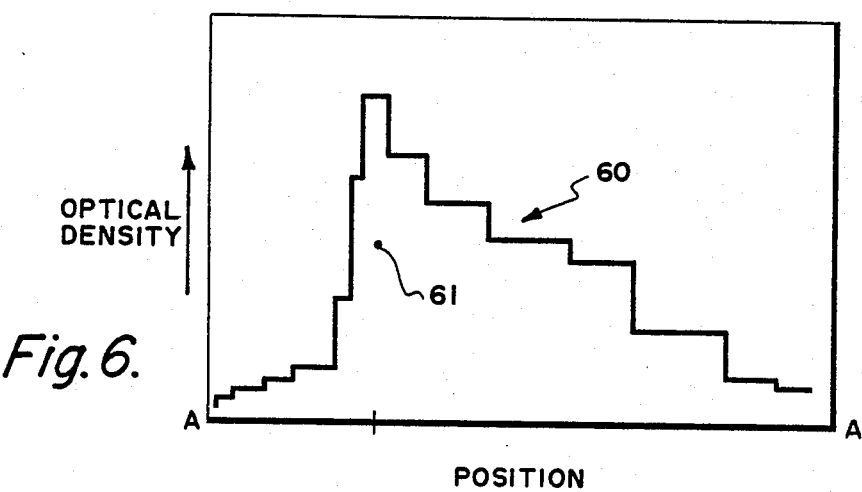
FIG. 6 is a plot of the optical density read along line A—A of the exemplification of FIG. 5.

The direction of each segment may be determined by a number of methods. One such method is the calculation of the direction of minimal directional derivative. There may be more than one direction per segment; when the directional derivatives are minimized, there is a direction for each point. The number of points is further reduced by averaging the intensity of the measurements along connected points in a direction perpendicular to the direction at that point. All of the measurements corresponding to points located across the width of a line segment can be reduced to a single measurement at center location 54 of intensity equal to the average of the measurements across the width of the segment at that point. The variation, 60 of FIG. 6, is replaced by single average value 61. The reduced segments may then be smoothed along their directions by locally averaging points.

The reduced data can at this point be compared to reference data, or they may be further analyzed. Further analysis may include calculation of the number of segments, of their endpoint locations, of their lengths, of their angles with respect to some reference axis, of the locations of direction reversals, of their relative densities, of the variation of direction with respect to density or to position, of the variation of density with respect to position or to direction, of the variation of segment length with respect to density or to position, or some other parameter, or some combination. After the final analysis step, the result is a series of vectors with elements of position direction, density and other parameters. These vectors are used for the reference comparison.

In reference comparison, the vectors representing a test specimen are compared to vectors representing a reference specimen. The reference vectors may be obtained by the same method as the specimen vectors—by optically scanning a reference specimen, either at the time of the specimen analysis or at some other time, or the reference vectors may be obtained by analysis of the pressure and directional variations during an act of handwriting. In the latter case, and in the case of entry of a vector from a previously scanned reference specimen, the device must be equipped with a communications port to receive the reference vector data. This may be the same port 34 as used to communicate from the scanning unit to the processing unit, or it may be a separate port. Alternatively, a large number of reference vectors may be stored in mass storage 42 for comparison as needed.

The reference comparison may use any of a variety of techniques, but most commonly will involve comparison of each element of each vector in the reference with corresponding elements in the specimen. The result of this comparison is a calculation of the extent of similarity between specimen and reference. The invention reports the extent of similarity on the control panel, and may assign an acceptable or unacceptable interpretation based on a minimum acceptable extent of similarity.

Figure 2:
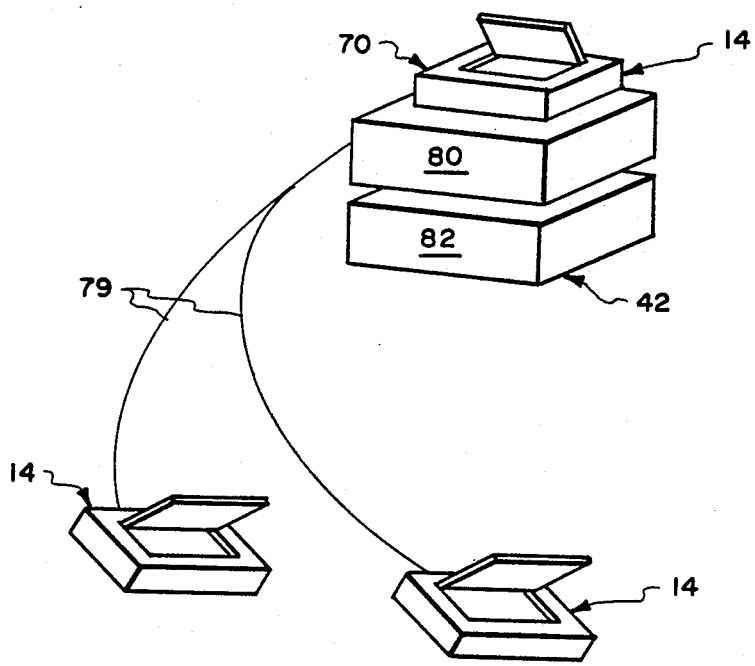
FIG. 2 is a schematic view indicating the relationship between the master unit and the various terminals in communication therewith.
Figure 3:
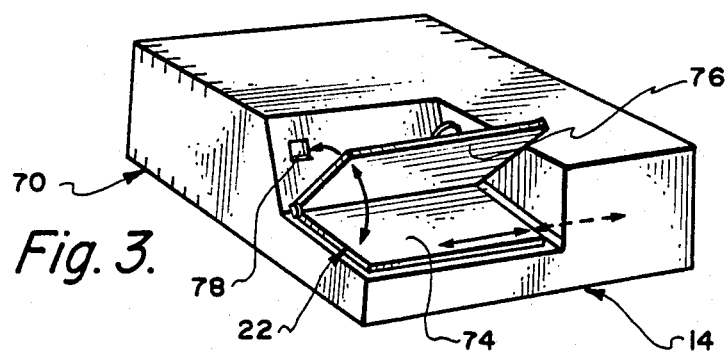
FIG. 3 is an enlarged view showing a typical terminal exterior view.

Referring to the drawings and, particularly, FIGS. 2 and 3 thereof, we show the scanner 14 as embodied in a housing 70 which includes an elongated, horizontally translatable platen 74. A cover 76 is associated with the platen to retain a check or other document in predetermined relationship with the platen, said cover being transparent to permit the reading of the signature or other material being analyzed. A start-stop button 78 initiates the examination transaction.

Associated with the scanner 14 and operatively connected thereto by suitable cables 79 are the housings 80 and 82 of the main and mass storage units, respectively.

Therefore, when a signature is submitted to inspection in the scanner, the output of the scanner is translated through the port 34 to the central processor main unit 40 and, ultimately, compared with the respective signature maintained in the mass storage unit 42.

Figure 4:
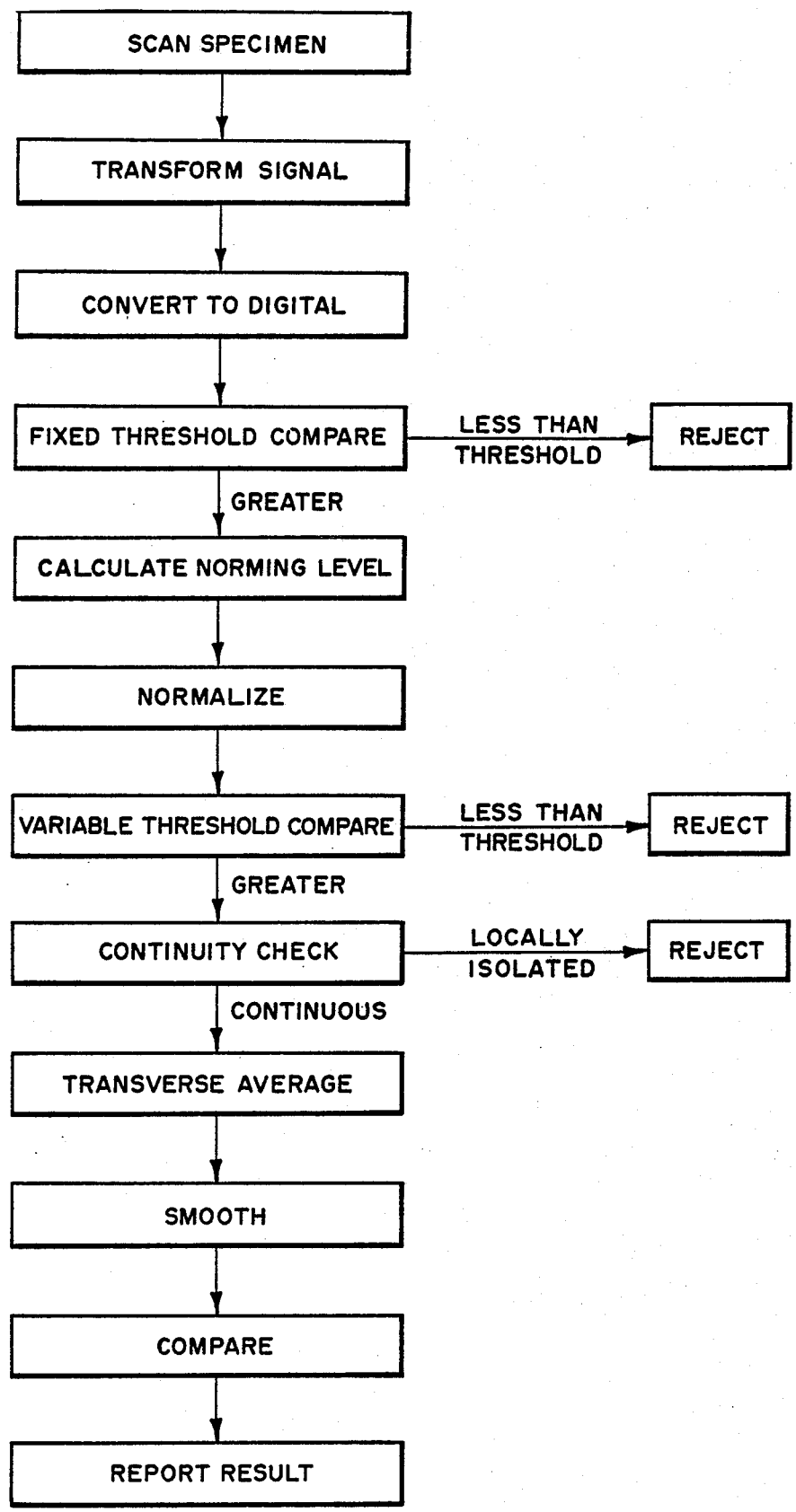
FIG. 4 is a flow chart establishing the series of steps encompassed in the method of the invention.

The series of steps which are followed in the comparison of the specimen signature or other specimen writing or document with the reference writing or other document is set forth graphically in FIG. 4. Obviously, the initial step is the scanning of the specimen and the creation of a signal resulting from the reading of the specimen. If optical reading is utilized, the reading is transformed and converted to a digital readout.

Initially, there is a fixed threshold comparison of the specimen with the reference signature or other reference item in storage and if the initial threshold comparison is less than the preestablished threshold, the signature or other specimen is automatically rejected. If the specimen exceeds the initial threshold comparison, the specimen signature is normalized to cause correlation of the intensity and other aspects of the signature with the reference signature. Subsequently, there is a variable threshold comparison established between the specimen signature and the reference signature. If the specimen signature reading is less than the variable threshold, the specimen signature is rejected.

If an element of the specimen signature passes the variable threshold comparison because it is greater than the variable threshold, it is then subjected to a continuity check and rejection will occur if local isolation of elements of the reference signature which are inconsistent with those of the specimen signature is perceived.

Now that the chosen elements of the specimen signature have passed the various threshold and continuity readings, a transverse average is established which is subsequently modulated to provide a uniformly smooth readout. The specimen signature is then compared to the corresponding reference signature and the report of the comparison is conveyed to the scanner by appropriate signals, such as the activation of a green or other light, not shown.

Empirical tests of the method and analogous devices of the invention have been made to establish the authenticity of both the hardware and the method of utilizing the same with conspicuously successful results. One of the most compelling objective examinations has consisted in the utilization of the forged signature of an individual in comparison with the genuine signature of the individual. The application of the method and apparatus of the invention has resulted in the perception of the identity of the source of both the genuine and forged signatures, even though the forged signature was deliberately written in such a manner as to effect a difference in the density between the genuine and forged signatures.

While we have disclosed the apparatus and method of the invention as being applied primarily to the detection of signature forgeries and other anomalies, it will be obvious to those skilled in the art that the teachings of the invention may be applied with equal cogency to other types of documentary evidence, and it is not intended that the teachings of the invention be limited specifically to the detection of forged signatures.

Moreover, while we have disclosed the apparatus and device of the invention as incorporated in specific electronic components, it will be obvious to those skilled in the art that there are numerous substitutions which can be made in the main unit and the scanner which will still fall within the scope of the claims relating to the apparatus or device and the method.

We claim:

1. A method for analyzing an inscribed specimen comprising the steps of:
    (a) collecting measurements of the optical density of a plurality of elements in the specimen across the grey scale;
    (b) selectively retaining a plurality of the density measurements;
    (c) processing the retained measurements by comparing each density measurement to a threshold value;
    (d) conditionally retaining each density measurement with reference to the threshold value;
    (e) forming a bounded locus of density measurements spatially distributed about each density measurement to be tested for retention;
    (f) retaining only those conditionally retained density measurements which are members of a set of conditionally retained density measurements including at least one density measurement of an element conditionally retained within the locus;
    (g) assigning retained density measurements to line segments;
    (h) determining the location of said segments;

(i) forming vectors by combining measurements of said measurements within each line segment; and (j) comparing the vectors to the vectors of a stored representation of a reference specimen.

2. The method of claim 1 wherein the stored representation of a reference specimen is obtained by analysis of the optical density variations of the reference specimen.

3. A device for analyzing an inscribed specimen including:

(a) means for collecting measurements of the optical density of a plurality of specimen elements across the grey scale, said means for collecting density measurements comprising remote optical scanning means which optically measure the light from each element of the specimen and transmits to a central processing unit;

(b) storage means for retaining a plurality of said density measurements;

(c) means for processing said retained measurements;

(d) means for reporting the results of said processing;

(e) comparison means for comparing each measurement to a threshold value;

(f) control means for conditionally retaining each measurement which discriminates from the threshold value and for forming a bounded locus of measurements spatially distributed about each measurement to be tested for retention, and for retaining only those conditionally retained measurements which are members of a set of conditionally retained measurements including at least a measurement within the locus; and (g) processing means for the retained measurements comprising means for converting said retained measurements to line segments, for determining the location of the segments, for forming vectors by combining said measurements within each line segment, and for comparing the vectors to the vectors of a stored representation of a reference specimen.

4. The device of claim 3 which includes reference input means whereby the stored vectors of a reference specimen is received by the device for comparison.

* * * * *